July 29, 1941.  W. G. RANSOM  2,250,725
BRAKE MECHANISM
Filed Dec. 1, 1939  4 Sheets-Sheet 1

INVENTOR
Willard G. Ransom.
BY Arthur C. Brown
ATTORNEY

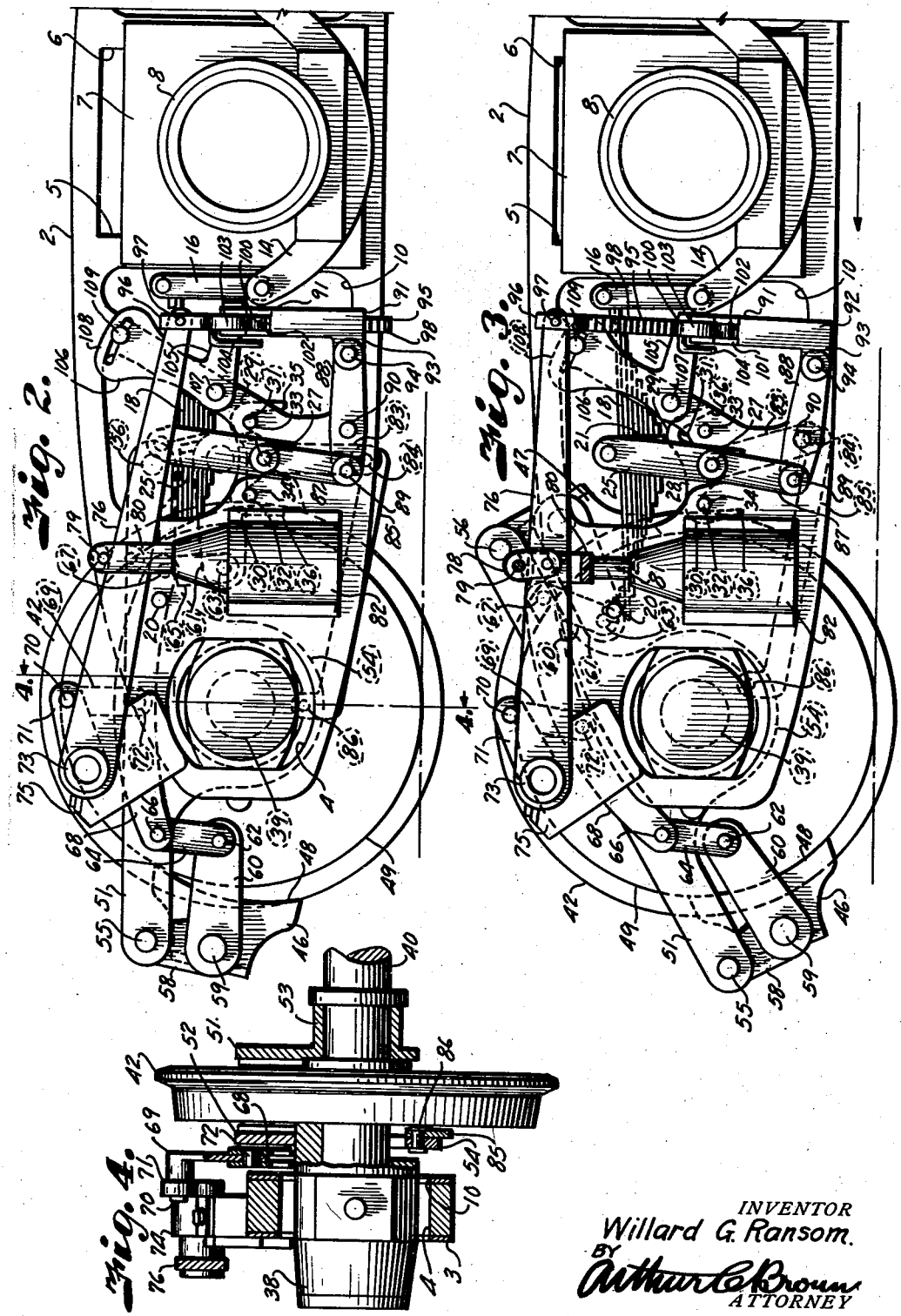

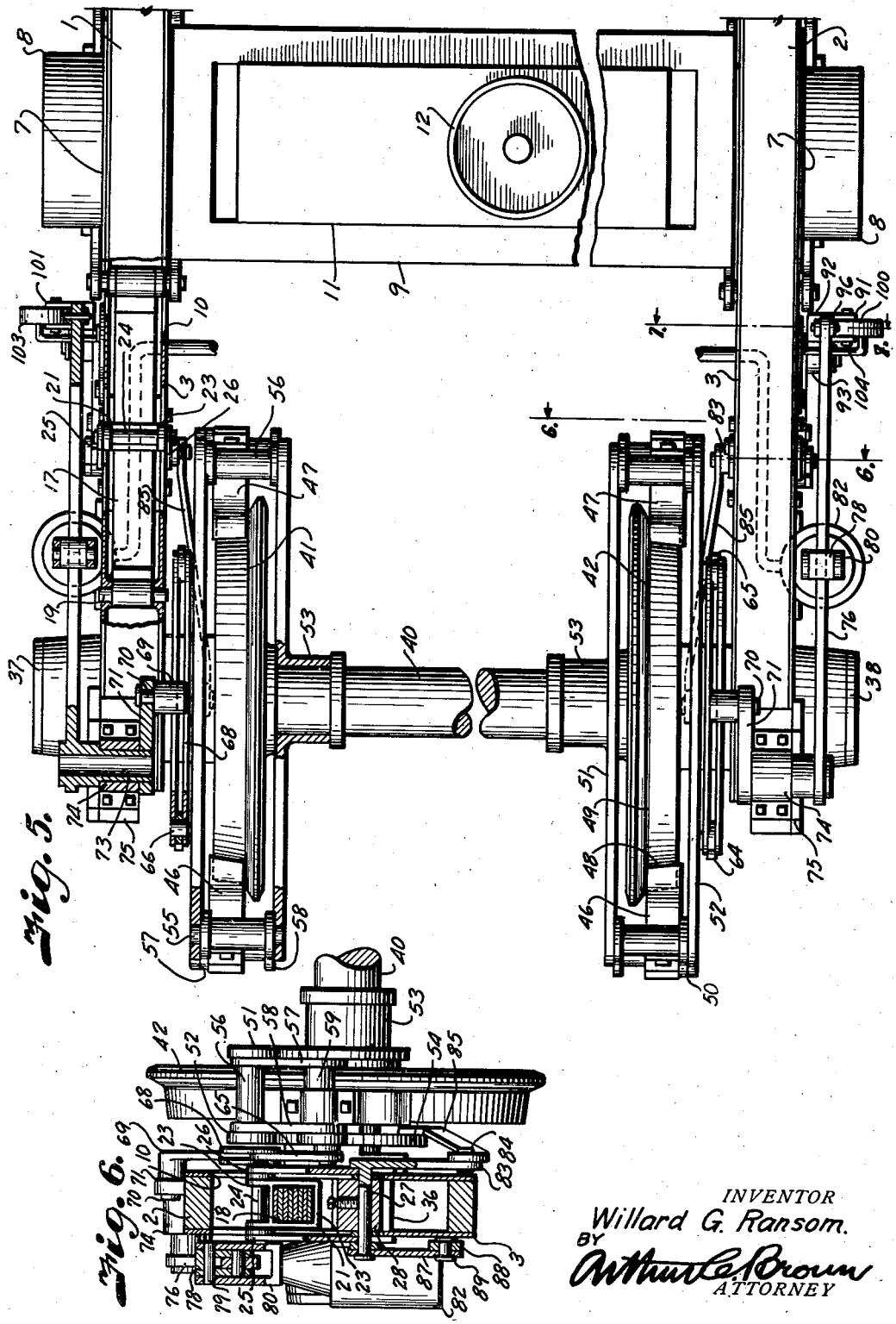

July 29, 1941.  W. G. RANSOM  2,250,725
BRAKE MECHANISM
Filed Dec. 1, 1939  4 Sheets-Sheet 4
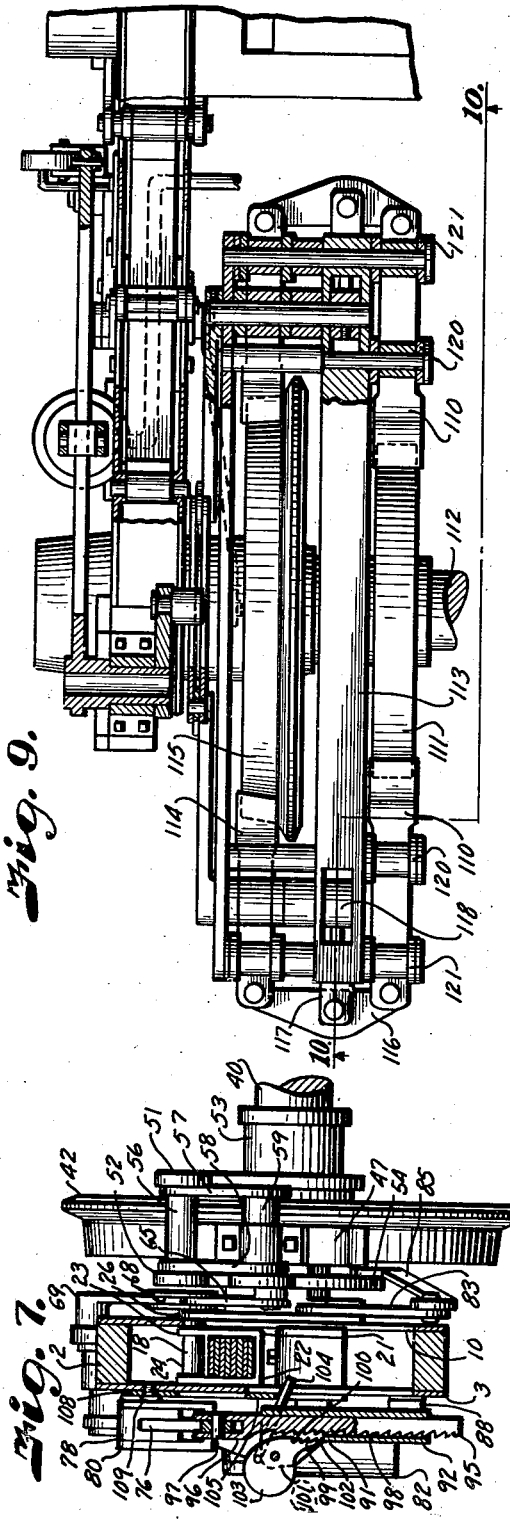
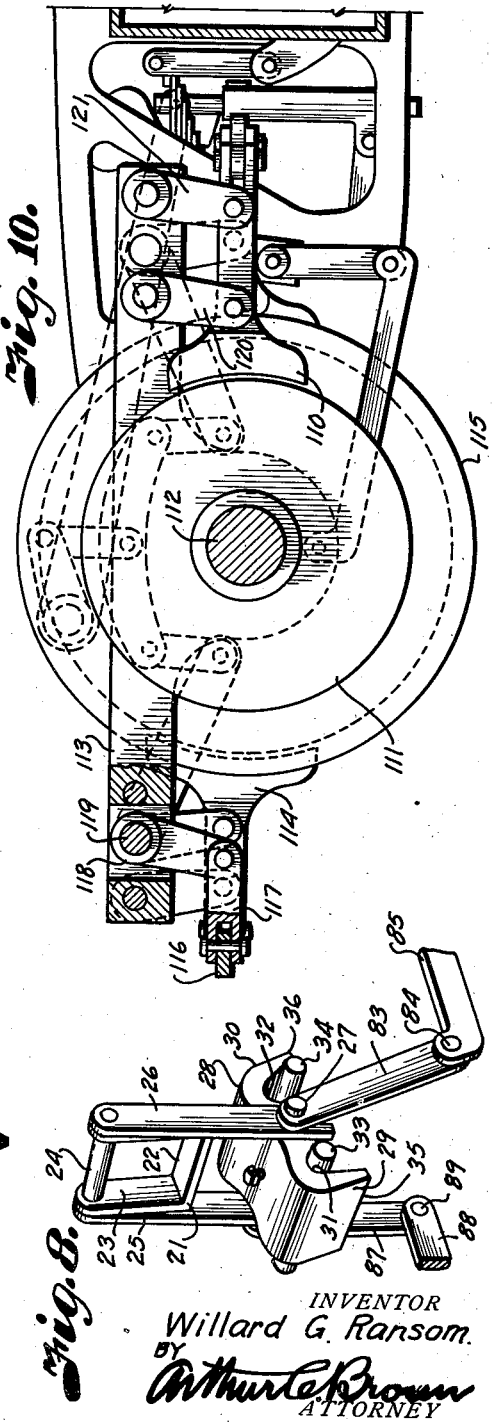
INVENTOR
Willard G. Ransom.
BY Arthur LeBrown
ATTORNEY Patented July 29, 1941

2,250,725

UNITED STATES PATENT OFFICE 2,250,725

BRAKE MECHANISM

Willard G. Ransom, Homewood, Kans.

Application December 1, 1939, Serial No. 307,090

15 Claims. (Cl. 188—195)

This invention relates to brake mechanism for moving vehicles designed to develop a retarding effort parallel to the travel surface, the amount of the retardation to equal or but slightly exceed some predetermined percentage of the weight carried by each wheel or pair of wheels.

The factor of adhesion between a wheel and the surface on which it travels together with the weight which the wheel exerts on the travel surface determines the maximum retardation permissible for such wheel without wheel sliding.

Most vehicles operate, at times, under varying conditions of load, whether railroad equipment, industrial equipment, or self-propelled equipment, such as motor cars, trucks, etc.

In Letters Patent No. 2,157,015 granted me on May 2, 1939, the tendency of the braking element to rotate with the retarded element was used to counteract the brake actuating force in such manner as to give a substantially uniform retardation with a constant actuating force, even though the coefficient of friction varied considerably.

The actual retardation obtained was approximately constant in amount and was based on the idea of but slightly varying loads per wheel.

Also with the equipment of Patent No. 2,157,015, strong actuating forces were required as the actuating force always partially opposed itself, and in the case of railroad equipment means larger air cylinders than is practical for trains of considerable length.

It is, therefore, the principal object of the present invention to provide a brake mechanism whereby a substantially uniform retarding effort is effected with smaller cylinders by balancing the rotational forces with the effective weight acting upon the respective wheels of a vehicle and utilizing the force in excess of that required to move the weight, in counteraction with the brake activating force.

Other objects of the invention are to provide a braking mechanism for each wheel of a truck and control, in part, the effective braking effort on the wheel responsive to the effective weight carried thereby; and to provide a relatively simple connection of the braking elements with certain supports of the vehicle or a part of the vehicle body, in cooperation with mechanism for transmitting counteracting forces to the brake actuator.

In accomplishing these and other objects of the invention, I have provided improved details of structure, using a railroad car truck as an example, the preferred forms of which are illustrated in the accompanying drawings wherein:

Fig. 2 is a side elevational view of the truck showing the brakes in released position.

Fig. 3 is a similar view showing the brakes in applied position after the retarding forces exceed the predetermined counteracting force.

Fig. 4 is a cross-section through a portion of the truck on the line 4—4 of Fig. 2.

Fig. 5 is a plan view of the portion of the truck shown in Fig. 1, partly in section.

Fig. 6 is a detail section on the line 6—6 of Fig. 5.

Fig. 7 is a similar detail section on the line 7—7 of Fig. 5.

Fig. 8 is a detail perspective view of the weight transfer mechanism.

Fig. 9 is a plan view of a modified form of the invention showing one of the truck wheels and associated parts with portions thereof in section to better illustrate the construction.

Fig. 10 is a sectional view on the line 10—10 of Fig. 9.

Figure 1:
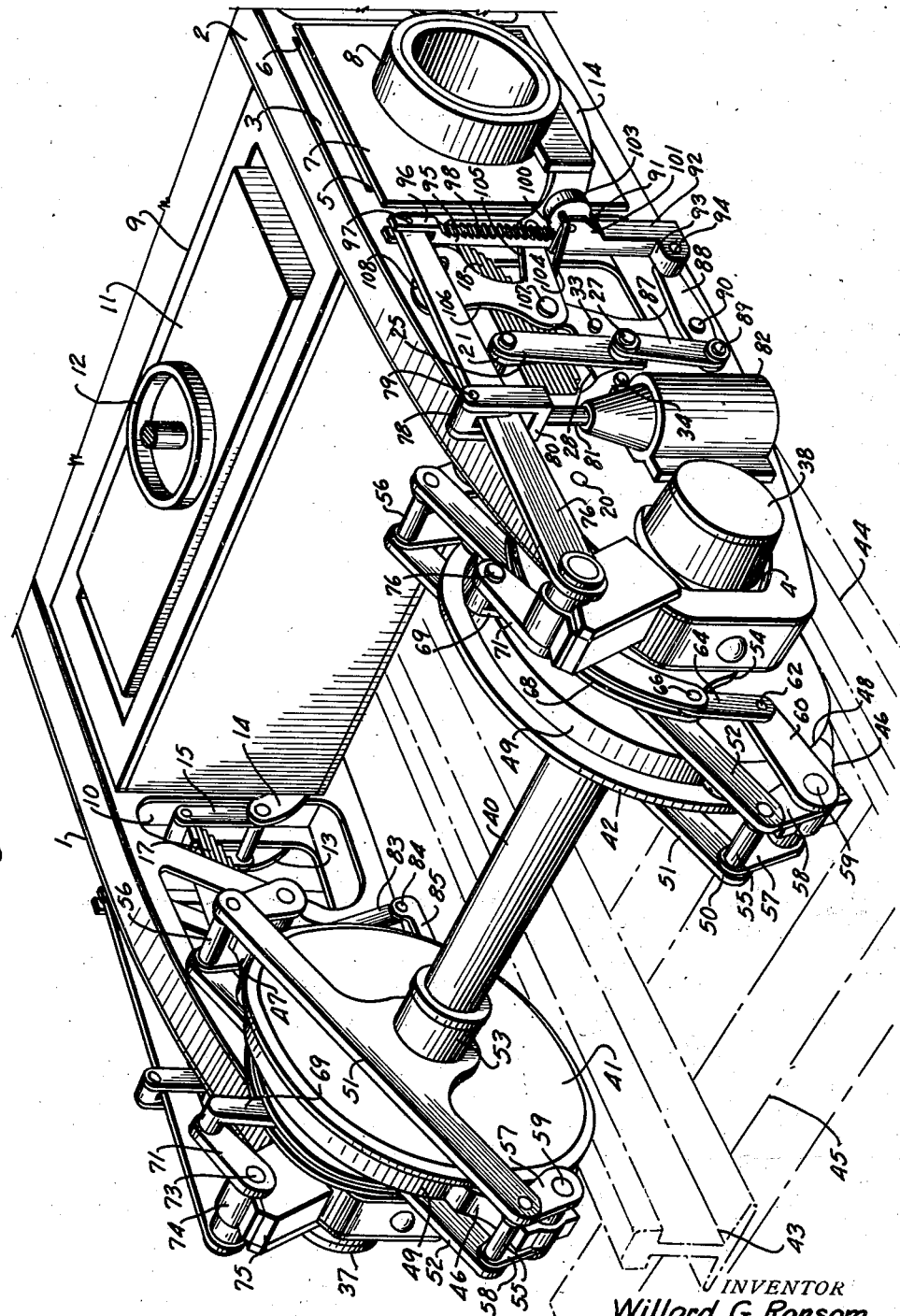
Fig. 1 is a perspective view of part of a railway truck equipped with a brake mechanism embodying the features of the present invention.

Referring more in detail to the drawings:

1 and 2 designate the side frames of a truck such as may support an end of a railway vehicle. The frames have plate-like sides 3 provided at the ends with journal mounting openings 4, and at the center with spaced columns 5 and 6 to guidingly support trunnion boxes 7 having bearings 8 in which are journalled the tubular trunnions of a box-like bolster 9. Intermediate portions of the plates are cut away, as at 10, to lighten the structure and accommodate various lever mechanisms later described.

Suspended within the bolster is a center bearing bridge 11, mounting the center bearing 12 on which the car body is pivotally supported. The trunnion bearings 8 project on their respective sides of the trunnion boxes 7 and are suspendingly supported on pairs of saddles 13 and 14 having their ends connected by shackles 15 and 16 with leaf springs 17 and 18. The opposite ends of the springs 17 and 18 are connected with the side frames by bolts 19 and 20 respectively. The intermediate portions of the springs are loosely seated on the side frames so that the shackle ends of the springs are cantilevered and adapted to be raised and lowered to lift the bolster and the weight of the car body carried thereon. The springs are therefore confined at approximately the center points thereof by strap-like brackets 21 having horizontal and side bar portions 22 and 23 respectively extending under the bottom and across the sides of the springs. The side bar portions extend above the springs and carry cross-pins 24 extending over the upper leaves of the springs as best shown in Figs. 7 and 8. The ends of the cross-pins 24 project sufficiently to journal in openings at the upper ends of post-like bars 25 and 26 which carry, at their lower ends, a cross-pin 27.

Fixed on the pin 27, intermediate the post-like bars, is a spring shifting lever 28, having hook-like arms 29 and 30, providing seats 31 and 32 for support on cross-pins 33 and 34 having their ends carried in the plates 3 of the side frame. The terminal ends 35 and 36 of the hook-like arms are of sufficient depth to assure retention of the shifting lever 28 on the pins 33 and 34. Mounted in the openings 4 in the ends of the respective side frames are boxes 37 and 38, journalling the bearing ends 39 of axles 40. Mounted on the axles are flanged wheels 41 and 42 which operate on the rails 43 and 44 of a track 45.

With the exception of the mounting of the bolster carrying springs 17 and 18, and the braking mechanism about to be described, the truck structure is substantially typical of standard railroad practice, and is adapted for high speed operation. High speed operation, however, necessitates more powerful and dependable braking systems in order to bring the train to a quick stop and this must be accomplished without sliding of the wheels on the rails. It is well known that speed retardation with a constant uniform brake applying pressure varies considerably because of change in coefficient of friction between surfaces of the braking and retarded elements, and which results from time of brake application, speed of wheel rotation, temperature of wheels and retarding elements, amount of pressure per unit of area, etc. Moreover, with these factors it has been impossible to maintain maximum retardation possible throughout the period of brake application. For example, a reducing coefficient of friction with a constant direct pressure results in reduction of the retarding effort which may fall below the rate of retardation permissible and desirable. On the other hand, increasing coefficient of friction may effect increase of the retarding effort to the point where the factor of adhesion between the wheels and rails is not sufficient in proportion to the retarding effort to prevent sliding of the wheels on the rails. The structure covered in the above mentioned patent overcomes this difficulty through automatic variation of the applied pressure inversely proportional to change in coefficient of friction. This was effected by providing mechanism for applying full pressure when the coefficient of friction was less, and by counteracting effectiveness of the applied pressure upon increase in coefficient of friction so that a minimum uniform retarding effort was effected throughout an entire period of brake application without sliding of the wheels. With the patented arrangement it was necessary to provide sufficient brake applying pressure to balance tendency of the brake elements to rotate with the retarded elements. Consequently with practical air brake pressure, the brake actuating cylinders were relatively large, and with a cylinder for each wheel in long trains, the resultant air consumption was too great. Therefore, in the present application I have provided a braking system wherein the tangential pull, or the retarding force created by the braking elements tending to rotate, is balanced through weight of the effective load acting upon the respective wheels and when the rotative reaction tends to increase beyond the predetermined amount, the tangential pull is effective in lifting some predetermined percentage of the load.

Any tangential reaction in excess of that required to lift the designed part of the load is utilized through certain levers and connections to react against the primary brake actuating force, tending to neutralize any activating force not required to give the desired retardation. That is, maximum retardation desired should substantially equal a certain percentage of the load and no more.

This arrangement has another advantage not possible with the patented structure in that the retarding effort applied to the respective wheels is proportional to the effective weight acting thereon. It is well known that when a train is under retardation the inertia of the load carried by the truck increases the effective weight on the forward wheels and reduces the effective weight on the rear wheels, consequently with uniform retardation for all wheels the retardation is too great for those wheels with lessened effective weight and too little for those wheels with increased effective weight.

In trucks equipped with a loose type of wheel, application of the brakes on curves results in tendency for the wheels on the inner side of the curve to slide, due to the centrifugal action, which reduces the effective pressure on the inner wheels and increases the pressure on the outer wheels.

In carrying out my invention, each wheel of the truck is provided with an independent braking system, including braking or retarding elements. As the braking system is identical for each wheel the description is directed to a single wheel, it being understood that the reference numerals refer to corresponding parts of the other wheels. The retarding elements in the present instance are illustrated as brake shoes 46 and 47 adapted to engage elements to be retarded, which, in the first illustrated instance, are the wheels 41 and 42, the brake shoes having arcuate faces 48 for directly engaging the tread faces 49 of the respective wheels. The brake shoes for each wheel are supported on an individual carrying frame 50 that is adapted to cradle about the axis of the wheels so that the brake shoes are allowed to move arcuately with rotation of the wheels, whenever the rotative force exceeds a certain predetermined percentage of the wheel load.

The frame 50 includes rocker arms 51 and 52, the inner of which has a bearing sleeve 53 oscilatable on the axle 40, and the outer one has a ring-like yoke 54 having bearing on the journal box 38, as shown in Fig. 4. The arms are of sufficient length to project beyond the rim of the wheel and carry cross-pins 55 and 56 carrying spaced links 57 and 58, suspendingly carrying the brake shoes therebetween on cross-pins 59. Fixed to the cross-pins, on the ends adjacent the outer sides of the wheel, are lever arms 60 and 61 extending toward the axis of the wheel and having pivotal connection, as at 62 and 63, with links 64 and 65, the links 64 and 65 being pivotally connected by pins 66 and 67 with an equalizer 68.

The equalizer 68 is shown as comprising spaced bars between which the links are pivoted as shown in Fig. 7. Pivotally connected with the equalizer, at a point intermediate the pivotal connection of the links 64 and 65, is a link 69, having pivotal connection by means of a pin 70 with a rocker arm 71, the link 69 being pivoted to the equalizer by a pin 72. The rocker arm 71 is fixed to the inner end of a rock-shaft 73 that is oscillatable in a bearing 74 carried in a bracket 75 on the side frame over the journal box (Fig. 5). Fixed to the outer end of the rock-shaft is a lever arm 76 extending parallel with the outer faces of the side frames and toward the transverse center of the truck. Pivotally connected by means of a pin 77, at an approximate distance from the axis of the rock-shaft, is a clevis 78 having pivotal connection across the top of the lever with a pin 79, having its ends carried by the arms of a yoke 80 which accommodates the clevis 78 and lever 76 therebetween.

The yoke 80 is carried on a piston rod 81 which is actuated by a piston (not shown) operating in a cylinder 82 fixed to the outer face of the side frame, which cylinder in general practice is connected with the air system of the train through the conventional equipment (not shown). When air is applied in the cylinder, the piston is raised therein to effect rocking movement of the lever 76 in a counter-clockwise direction (Fig. 2) and a corresponding movement of the rocker arm 71 to exert a pull on the equalizer to assure upward rocking movement of the brake lever arms 60 and 61, which lever arms, being fixed with the cross-pins 59 and brake suspending links 57 and 58, cause movement of the brake shoes in gripping contact with the tread faces of the wheels and exert a braking pressure thereagainst, the effectiveness of which is proportional to the coefficient of friction occurring between the braking surfaces of the shoes and wheel. Upon engagement of the brake shoes there is a tendency for the shoe carrying frame to rock about the axis of the wheel and rotate therewith, which tendency, being resisted, is proportional to the coefficient of friction.

In order to balance the forces for tangential pull acting on the brake shoes and through the shoes to the carrying frame, I connect the carrying frame with the spring lifting lever 28. This is effected by affixing a lever arm 83 to an end of the cross-pin 27 (Fig. 8), and by pivotally connecting the free end of the lever arm, as at 84, with a link 85 that has its opposite end pivotally connected, as at 86, with the yoke portion 54 of the inner rocker arms 52 of the rocker frame at a point directly below the axle. Thus when the frame tends to rock in the direction of wheel rotation, a force is directed through the link 85 to rock the lever arm 83, which causes fulcruming of the spring lifting lever on one or the other of the pins 33 or 34, depending upon the direction which the actuating lever is moved. For example, assuming that the truck is moving along the track in the direction of the arrow (Fig. 3), the wheel is being rotated in an anti-clockwise direction, which causes the shoe carrying frame to tip in a corresponding direction. This movement effects a pushing action on the lever arm 83 by the link 85 and fulcrums the spring lifting lever on the pin 34, lifting the opposite end off the pin 33 and elevating the cross-pin 27 which moves in an arc about the axis of the pin 34 thereby lifting the spring through the spring bracket 21, whereby the effective weight of the load, acting on the spring (17 or 18), resists tendency for the shoes to rotate upon application of the brakes. However, when the coefficient of friction increases beyond the point where the tendency for the shoes to rotate preponderates over the weight acting on the spring, the spring is lifted, moving the load. At this point the retarding effort effected by the shoes through the applied power is reaching the point where there is a tendency for the wheels to slide on the rail unless the force of the applied pressure is counteracted, as in the instance of the structure covered in my patent above mentioned. Therefore when the tangential pull is effective in lifting the load, rocking movement of the spring lifting lever is transmitted to the brake actuating lever in opposition to the cylinder pressure. The opposite end of the pin 27 is therefore provided with a link 87, to which is pivotally connected a rocker arm 88 by a pin 89, the rock lever being pivotally mounted on a pin 90 projecting from the side of the frame. Thus when the pin 27 swings through its arc relatively to the pin 33, an upward pull is imparted to the rock lever 88 through the link 87. The opposite end of the lever is connected with the brake actuating lever through a gripping mechanism 91.

The gripping mechanism includes a sleeve 92 having a lateral ear 93 at its lower end pivoted on a pin 94 projecting from the end of the rocker arm 88. Slidably mounted in the sleeve is a bar 95 provided with a yoke 96 at its upper end and engaging the free end of the brake lever arm 76, and which is pivotally connected therewith by a pin 97. The bar 95 has teeth 98 with shoulder portions thereof facing upwardly to be engaged by the teeth 99 on a pawl 100 when the sleeve is carried downwardly upon rocking movement of the rocker arm 88. In the illustrated instance the pawl 100 is pivoted between ears 101 located on opposite sides of a slot 102 (Fig. 3) in the sleeve 92, the pawl 100 being weighted as at 103 so that the teeth thereon normally tend to engage the teeth of the bar. The pawl is normally retained from contact with the teeth of the bar by an arm 104 which in normal position of the sleeve 92 engages an arm 105 of an adjusting lever 106 pivoted on the outer plate of the side frame as at 107. The lever also includes a slotted head 108 adapted to be adjustably clamped against the plate portion of the side frame by a bolt 109 extending through the slot of the head. By loosening the bolt, the arm 105 may be raised or lowered to vary holding position of the pawl away from the bar teeth. The sleeve may therefore have an idle initial movement before the counteracting force is applied to the lever 76. When air is admitted to the air brake cylinders 82, the brake actuating lever 76 is free to move upwardly to effect application of the brakes since the bar 95 moves freely through the sleeve. However, when tangential pull on the brake shoes 46 and 47 is sufficient to effect lifting of the load on the springs 17 and 18, the spring lifting lever 83 is rocked to cause rocking movement of the rocker arm 88 to swing the sleeve carrying end thereof downwardly, which exerts a downward pull on the brake actuating lever 76 through the coupling afforded by engagement of the pawl with the bar, this coupling having been effected through movement of the arm 104 away from the arm 105. As the tangential pull decreases incidental to reduction of the braking force the weight lifted acts to move the lever 28 toward its normal position which lowers the cross-pin 27 and rocks the arm 88 in the opposite direction, lifting the pawl 100 so that it is free of the tooth with which it was engaged. The air in the brake cylinder is then fully effective since relative movement between the rack bar 95 and pawl is the same direction. However, if the tangential pull increases, the action is again reversed to control the braking effort effected by the brake cylinder. The power of the air brake cylinder 82 is therefore counteracted in proportion to the tangential pull in excess of that tending to lift weight on the spring.

When the brake mechanism is applied as described, and the retarding effort is effective, the inertia of the load carried by the truck tends to apply a greater effective weight on the front wheels, increasing adhesion of the wheels with the rails and reducing the weight on the rear wheels. However, when this occurs the added effective weight on the front wheels supplements the normal load lifted through tangential pull of the brakes of the forward wheels, with the result that the applied braking force is increased in proportion to the tendency of the load to shift to the forward wheels and by reducing the effective load on the rear wheels causes a proportionate reduction of retardation of the rear wheels, hence holding down the tendency to slide the wheels.

It is thus obvious that a maximum braking pressure may be maintained upon each of the wheels as governed by the tangential pull on the brake shoes, together with the effective load carried on the respective wheels.

Figs. 9 and 10 show a modified arrangement wherein brake shoes 110 are used in conjunction with a brake disk or drum 111 that is fixed to the truck axle 112, with the brake shoes carried by a rocker frame 113 and controlled in the same manner as the rocker frame in the preferred form. This mechanism may be employed alone or in conjunction with the braking shoes 114 operating on the tread faces of the truck wheel 115. In this instance the brake shoes 114 are also carried by the rocker frame 113 and the related shoes are interconnected by an equalizer bar 116, which is connected by a link 117 with a rocker arm 118 carried on a shaft 119 journalled in the rocker frame, similar to the rocker shaft in the preferred form of the invention. In this instance the brake shoes are suspended by pairs of links 120 and 121 from the rocker frame, otherwise the structure is similar to that of the preferred form.

From the foregoing it is obvious that I have provided a brake mechanism having all the advantages of that disclosed in my patented structure, but which does not require the large actuating cylinders since the tangential pull is initially balanced by weight in the form of the car body and load carried thereby. The effective retarding force is thus not only under control of any variation in coefficient of friction between the shoes and wheels but is under control of the weight applied to the wheels and therefore the braking forces may be kept at a maximum but within the range below the point where the wheels might tend to slide on the rails.

What I claim and desire to secure by Letters Patent is:

1. In a brake mechanism including a rotary element to be retarded and a braking element engageable therewith, the combination of power means for setting the braking element in braking engagement with the rotary element, a load supporting element, control means responsive to tangential pull on the braking element for counteracting the effective force exerted by said power means, and counterbalancing means for initially balancing said counteracting forces to a predetermined amount of the load carried by the load supporting element.

2. In a brake mechanism for railway trucks including a rotary element to be retarded and a braking element engageable therewith, the combination of power means for setting the braking element in braking engagement with the rotary element, control means responsive to tangential pull on the braking element for counteracting the effective force exerted by said power means, load supporting means, and means connecting the load supporting means with the control means for initially balancing said counteracting forces transmitted through the control means.

3. In combination with a rotary member, a brake member frictionally engageable with the rotary member, means for applying a braking force to the brake member, means for counteracting the brake applying means for controlling direct pressure of the brake member against the rotary member as the coefficient of friction changes, and load activated means for controlling said counteracting means.

4. A brake mechanism including a load carrying rotary element to be retarded, power actuated braking means connected with said rotary element and subject to changing coefficient of friction, and counteracting means dependent upon coefficient of friction and controlled by weight of the load carried upon the rotary element for counteracting the force effected by said power actuated braking means for maintaining a substantially uniform retardation of the rotary element.

5. A brake mechanism for controlling rotational speed of a wheel including a brake shoe, means supporting the brake shoe for movement in the direction of the wheel rotation, an actuator for moving the brake shoe into contact with the wheel, a movable load supporting means, means connected with the actuator and movable in a direction to lift said load supporting means for counteracting the force applied to the shoe in proportion to the tendency of said shoe to rotate with the wheel, and means having connection with said last named means for applying variable resisting forces thereto in its action to lift said load supporting means.

6. In a truck, means movably supporting a load carried by the truck, braking means on the truck including a braking member, an actuator for the braking member, means movably supporting the braking member for movement responsive to tangential pull exerted against the braking member, means connecting the movable load support on the truck with said movable brake member supporting means whereby tangential pull on the brake member is balanced by the load on the truck and serves to transmit a counteracting force to the brake actuator, and means for selecting the predetermined portion of said tangential pull which shall transmit said counteracting force.

7. In a truck, means movably supporting a load carried by the truck, braking means for the truck, an actuator for said braking means, means connecting the movable load support on the truck with said braking means whereby tangential pull on the braking means is balanced by the load on the truck and serves to transmit a counteracting force to the brake actuator, and means connecting the load support with the actuator for selecting the predetermined portion of said tangential pull which shall transmit said counteracting force.

8. A truck including a frame, wheels carried by the frame, individual braking mechanisms for the respective wheels, a brake actuator for each brake mechanism, and means responsive to load carried by a respective wheel for individually controlling the actuator for that wheel.

9. In a brake mechanism, a rotary member to be retarded, a brake shoe carrier, means movably supporting the brake shoe carrier for rocking movement about the axis of the rotary member, a brake shoe on said carrier, a rock-shaft, means connecting the rock-shaft with the brake shoe carrier, an actuating lever on the rock-shaft, an actuator connected with the actuating lever, a load support, means connecting the load support with the brake shoe carrier to render the load movable in response to movement of the brake shoe carrier, and motion transmitting means connecting the last named means with said actuating lever to thereby render movement of said lever responsive to the aforesaid movement of the load support.

10. In a brake mechanism for retarding a load supporting rotating element, friction elements to engage the rotating element, a power unit, lever mechanism connecting the power unit with the friction elements, and means responsive to a portion of said load carried by the rotating element for causing tangential reaction of the friction elements to overcome and lift a portion of the load carried by the rotating element to cause an effective lever change in the lever mechanism and to cause a change in pressure of said friction elements against the rotative element thereby obtaining an approximately uniform tangential reaction.

11. In a railway truck, wheels carried by the truck, brake shoe carriers supported for rocking movement about the axis of the wheels, shoes on said carriers, actuators for said shoes, movable load supports on said truck, means connecting the load supports with said carriers whereby movement of the carriers is transmitted to the load supports, and motion transmitting means connecting the actuators with said last named means to thereby render movement of said actuators responsive to the aforesaid movement of the load supports.

12. A brake mechanism including a load carrying rotary element to be retarded, friction braking means connected with said element and subject to changing coefficient of friction, an actuator for rendering said braking means effective to retard said element, load lifting means adapted to lift said load in response to change in coefficient of friction, and means acted upon by said load lifting means for counteracting the force of said actuator when the torque reaction resulting from increase in coefficient of friction between the friction means and the rotary element is in excess of the resistance offered by the load to be lifted.

13. In a truck, a load carrying support on the truck, brake means including rotary and brake members, means supporting the brake member for partial rotation with the rotary member upon engagement of the brake member therewith, means for applying a braking force to engage said brake member with the rotary member, motion transmitting means connecting the load carrying support with said brake supporting means to lift the load carrying support in response to said relative rotation, and means for effecting a limited retardation of the rotary member by said brake member in proportion to the effort required to initiate lifting of the load.

14. A braking mechanism including rotary and braking members, means supporting the braking member for movement in direction of rotation of the rotary member, an actuator for moving the braking member into contact with the rotary member, means connecting the actuator with the braking member, a movable load support, and means connecting the movable load support with the actuator and movable in the direction to lift the load support under control of the load of said movable load support for counteracting the force applied to the braking member in proportion to the tendency of said braking member to rotate with the rotary member.

15. In a truck having front and rear pairs of wheels with the respective wheels subject to varying loads, an individual braking means for each wheel, actuating means for each braking means, control means having connection with the brake actuating means and responsive to tangential pull of the wheels on said braking means when the braking means are applied, and means cooperating with the control means and actuated responsive to said tangential pull to lift a portion of the load weight acting on the respective wheels to regulate the effectiveness of said brake actuating means proportionate to the load acting upon the respective wheels.

WILLARD G. RANSOM.